United States Patent
Frainie et al.

(10) Patent No.: US 10,279,619 B2
(45) Date of Patent: May 7, 2019

(54) DECALS FOR SPORTS FLOORS

(71) Applicant: PRATERS INCORPORATED, Chattanooga, TN (US)

(72) Inventors: Mark Edward Frainie, Chattanooga, TN (US); John Fitzgerald Prater, Rossville, GA (US)

(73) Assignee: Praters Incorporated, Chattanooga, TN (US)

( * ) Notice: Subject to any disclaimer, the term of this patent is extended or adjusted under 35 U.S.C. 154(b) by 537 days.

(21) Appl. No.: 14/851,312

(22) Filed: Sep. 11, 2015

(65) Prior Publication Data

US 2016/0075171 A1  Mar. 17, 2016

Related U.S. Application Data

(60) Provisional application No. 62/049,587, filed on Sep. 12, 2014.

(51) Int. Cl.

| | |
|---|---|
| B32B 7/12 | (2006.01) |
| B44C 1/10 | (2006.01) |
| B44C 1/16 | (2006.01) |
| B32B 27/08 | (2006.01) |
| B32B 27/30 | (2006.01) |
| B44C 1/165 | (2006.01) |

(52) U.S. Cl.
CPC ............. *B44C 1/165* (2013.01); *B32B 7/12* (2013.01); *B32B 27/08* (2013.01); *B32B 27/30* (2013.01); *B44C 1/105* (2013.01); *B32B 2250/24* (2013.01); *B32B 2255/10* (2013.01); *B32B 2255/26* (2013.01); *B32B 2255/28* (2013.01); *B32B 2307/402* (2013.01); *B32B 2307/412* (2013.01); *B32B 2307/538* (2013.01); *B32B 2307/554* (2013.01); *B32B 2307/744* (2013.01); *B32B 2307/75* (2013.01); *B32B 2451/00* (2013.01); *B32B 2471/00* (2013.01); *B44C 1/16* (2013.01); *B44C 1/162* (2013.01)

(58) Field of Classification Search
CPC ........... B44C 1/16; B44C 1/162; B44C 1/165; B32B 27/30; B32B 2471/00; B32B 2307/402; B32B 2307/412; B32B 2307/554; B32B 2307/744
See application file for complete search history.

(56) References Cited

PUBLICATIONS

Maple Floor Manufacturers Association Industry Recommendations for Sanding, Sealing, Court Lining, Finishing, and Resurfacing of Maple Gym Floors © 2008 (Year: 2008).*

* cited by examiner

*Primary Examiner* — Carson Gross
(74) *Attorney, Agent, or Firm* — Husch Blackwell LLP

(57) ABSTRACT

A decal assembly applied to a finished wood floor comprising a visible layer, a clear layer adhered to the visible layer, and a floor finish layer, wherein an outer surface of the floor finish has a coefficient of friction similar to the finished wood floor. The floor finish may be water-based or oil-based and the decal assembly may include an adhesion promotion layer disposed between the clear layer and the floor finish layer. The decal assembly may also include the clear layer having a roughened outer surface. The decal may be installed on a wood floor by laminating a clear layer to a visible layer, roughening an outer surface of the clear layer and applying a floor finish to the outer surface of the clear layer after the roughening step. An adhesion promotion layer may also be applied between the clear layer and the floor finish layer.

6 Claims, 2 Drawing Sheets

DECALS FOR SPORTS FLOORS

CROSS-REFERENCE TO RELATED APPLICATION

This application claims the benefit of U.S. Provisional Patent Application No. 62/049,587 filed Sep. 12, 2014, the entire disclosure of which is hereby incorporated by reference.

FIELD OF THE INVENTION

This present invention relates to temporary or semi-permanent decals which can be applied to sports floors, including wood floors or other flooring surfaces for athletic events.

BACKGROUND OF THE INVENTION

Modern basketball court floors are typically constructed of wood. There are performance specifications for the finish of wood courts, particularly when it comes to traction and grip. These specifications ensure that players on the court have a consistent support surface from venue to venue and that slippage is reduced, thereby improving player safety. These specifications first and foremost protect the safety and well-being of the athletes.

Within the business of collegiate and professional basketball markets, and other court-sport markets, there is the continual need for college and professional basketball teams to seek sponsorship and advertising revenues to increase the profitability of their operations. Over the years, the advertising and television revenues associated with college and professional basketball have been steadily increasing. To provide more advertising opportunities for temporary sponsorships or advertising, or semi-permanent applications, there has recently been a need in the art for decals applied to the wood floors to promote a particular event, product, or sponsor. These decals may be desired to be in place for one game (a temporary application), a particular tournament, or an entire season (a semi-permanent application). One early finding was that the decals which are simply applied over the finished wood court surface provide a wearing surface that has a significantly different coefficient of friction than the finished wood court surface. This inconsistent playing surface resulted in a few player injuries. As such, the bodies governing the sports mandated that the decals have a similar coefficient of friction as the finished wood surface. To accommodate this, early providers of these decals simply applied a layer of the floor finish over a vinyl decal once it was adhered to the floor. This provided a consistent surface on a very temporary basis; however, after being used for more than just a few games, the finish layer delaminates from the surface of the decal in unpredictable locations and/or chips off to expose portions of the vinyl decal. This delamination or chipping of the floor finish layer on the previous decals requires regular maintenance and/or reapplication of the decal and/or coating layer. Moreover, this unpredictable surface inconsistency also leads to athletes slipping or turning ankles or knees due to encountering the exposed vinyl portions of these decals. Regular maintenance and/or reapplication of the finish layer is cost and labor intensive and cuts into the financial incentive to use temporary or semi-permanent decals to provide on-floor advertising or sponsorship signage.

Another attempt to provide a useable decal was a laminated vinyl decal in which the top surface was manufactured to include the required coefficient of friction. However, these decals have been shown to wear really fast and quickly lose the necessary coefficient of friction. Thus, the performance of these type of laminated decals is inconsistent, unreliable and do not allow for semi-permanent use.

Thus, there is a need in the art to supply a coated decal that (1) has a surface with a coefficient of friction matching the remaining wood floor, and (2) provides a durable finish which allows the decal to be used on both a temporary (such as a single game or weekend tournaments) and semi-permanent basis (such as an entire season or significant portion thereof) without requiring additional maintenance and/or replacement.

SUMMARY OF THE INVENTION

The present invention relates to a decal or decal assembly that can be applied to a wood floor, typically on a temporary or semi-permanent basis and a method for constructing such a decal. One embodiment of the present decal assembly comprises a visible layer, a clear layer adhered to the visible layer, and a floor finish layer, wherein an outer surface of the floor finish layer has a coefficient of friction similar to the finished wood floor. The visible layer and the clear layer may be made from vinyl sheets or other similar materials, and the adhesion promotion layer and floor finish layers may be liquid layers.

The decal assembly may also include the clear layer having a roughened outer surface. The floor finish may be water-based or oil-based and the decal assembly may include an adhesion promotion layer disposed between the clear layer and the floor finish layer.

The decal may be installed on a wood floor in a number of ways. One method includes applying the visible layer on-site, applying the clear layer over the visible layer on-site, roughening the top surface of the clear layer on-site, cutting the decal to shape along a cut line on-site such that some overhang left, and applying the liquid finish layer on-site such that it extends past the cut line, but not extending past the overhang portion.

Another embodiment includes mechanically laminating the visible and clear layers of the decal off-site in a production or otherwise controlled environment. In this embodiment, the top surface of the clear layer can be mechanically roughened before or after it is laminated to the visible layer. Then, the pre-laminated visible and clear layers are applied to the wood floor on-site and the liquid layers are applied over the visible and clear layers. In one embodiment, the liquid layers include both an adhesion promotion layer and a floor finish layer. In another embodiment, only the floor finish layer is applied over the clear layer.

In another preferred embodiment, all the layers are constructed off-site in a controlled embodiment. The clear layer is mechanically applied to the visible layer. The clear layer is then roughened (abraded, scratched) in preparation of the adhesion promotion layer and gym floor finish. The adhesion promotion layer and the floor finish layer are applied in this controlled environment. Once dry, this assembled product can be packaged and shipped anywhere in the world and applied to the surface of the court ready to be played on.

Other aspects and advantages of the present invention will be apparent from the following detailed description of the preferred embodiments and the accompanying drawing figures.

Figure 1:
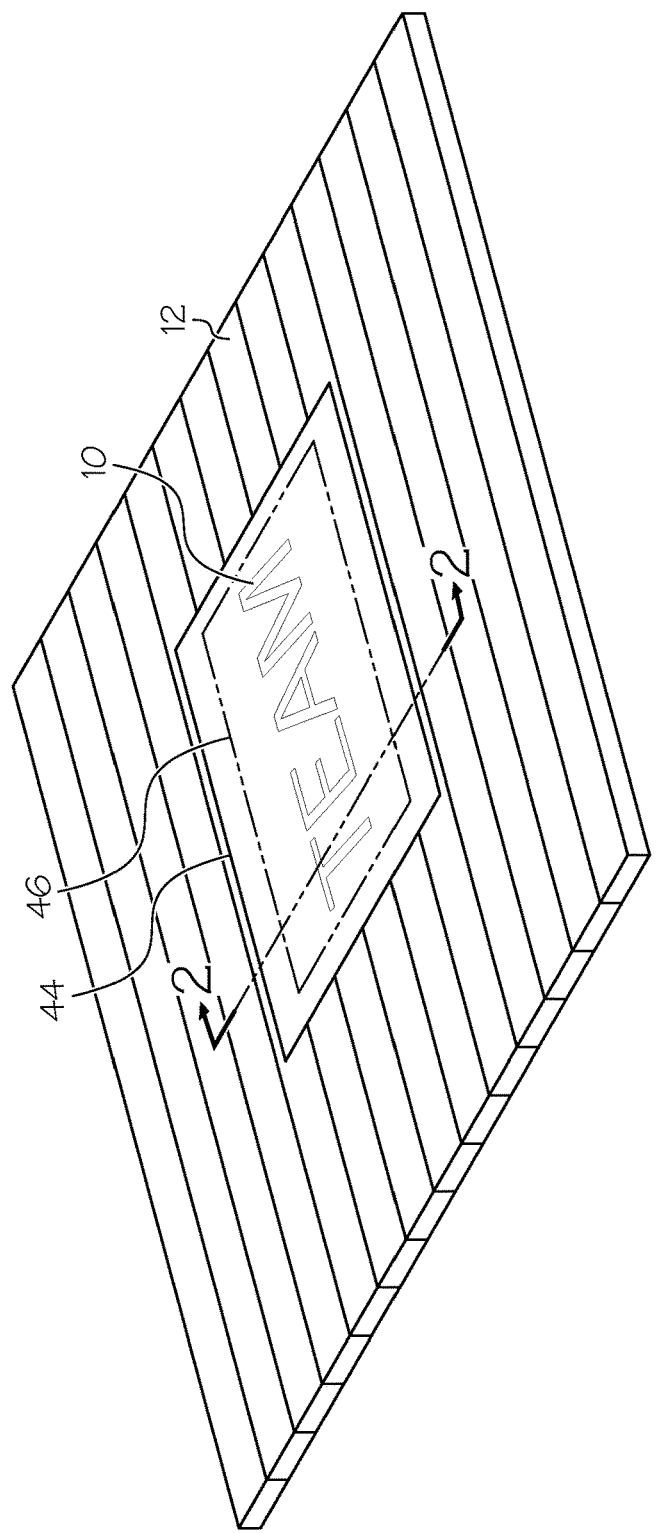
FIG. 1 is a perspective view of one embodiment of a decal for a wood floor in accordance with the teachings of the present disclosure.

While the disclosure is susceptible to various modifications and alternative forms, a specific embodiment thereof is shown by way of example in the drawing and will herein be described in detail. It should be understood, however, that the drawings and detailed description presented herein are not intended to limit the disclosure to the particular embodiment disclosed, but to the contrary, the intention is to cover all modifications, equivalents, and alternatives falling within the spirit and scope of the present disclosure as defined by the appended claims.

DETAILED DESCRIPTION OF THE INVENTION

The following detailed description of the present invention references the accompanying drawing figures that illustrate specific embodiments in which the invention can be practiced. The embodiments are intended to describe aspects of the present invention in sufficient detail to enable those skilled in the art to practice the invention. Other embodiments can be utilized and changes can be made without departing from the spirit and scope of the present invention. The present invention is defined by the appended claims and, therefore, the description is not to be taken in a limiting sense and shall not limit the scope of equivalents to which such claims are entitled.

Figure 2:
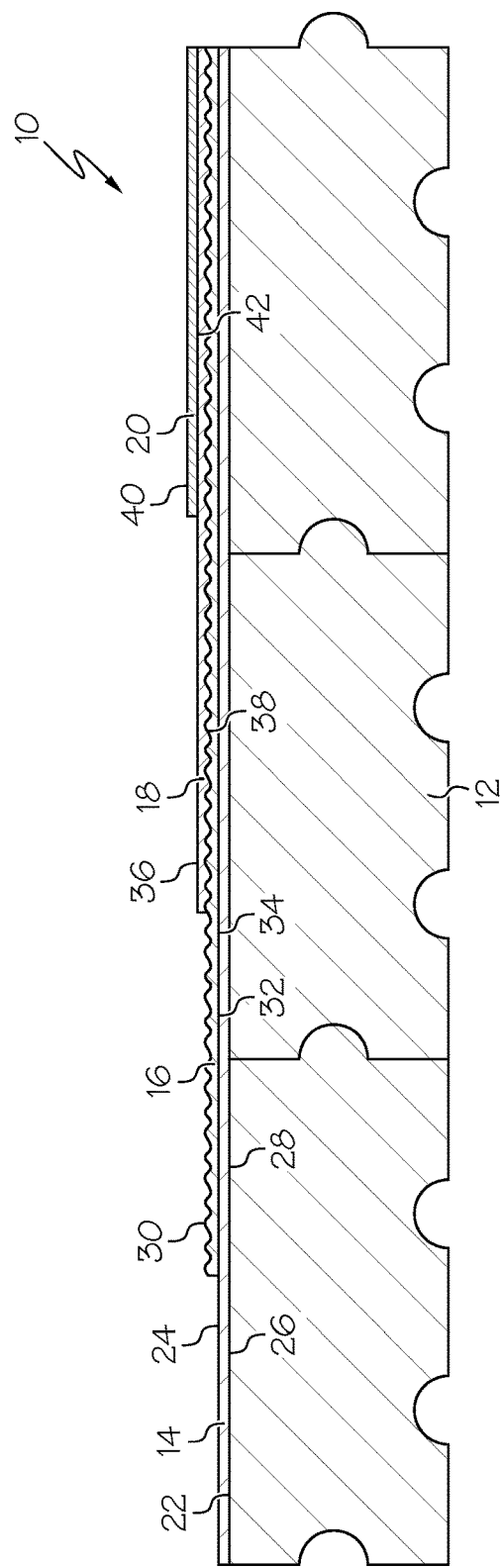
FIG. 2 is a schematic section view of one embodiment of a decal for a wood floor in accordance with the teachings of the present disclosure showing the location and build-up of the layers of the present detail cut along the line 2-2.

The present invention relates to a decal or decal assembly that can be applied to a wood floor, typically on a temporary or semi-permanent basis, and a method for constructing such a decal. FIG. 1 illustrates one embodiment of a decal 10 of the present invention disposed on a wood floor 12. FIG. 2 illustrates decal 10 including a visible layer 14, a clear layer 16, an adhesion promotion layer 18, and a floor finish layer 20.

Wood floor 12 may be any athletic performance flooring, but will typically be a wood floor of a gymnasium or athletic arena. Wood floor 12 may be solid wood, engineered, any other mixture of the two in current use, or any other synthetic athletic performance floor, including rolled vinyl sheet goods, poured in place urethane and combo poly-urea systems. When wood floor 12 is made from solid or engineered wood, it is typically made from maple, birch, or beech wood. However, a floor of any wood material, such as oak, bamboo, hickory, ash, pine, or any other common flooring wood is within the scope of the present invention. Wood floor 12 may be a permanent installation or a temporary wood floor that can be easily removed in sections like the ones currently used in many multi-use arenas. Often, such wood floors 12 have lines, words, logos, or other indicators permanently painted on the top surface 22 of wood floor 12 wherein such painted logos are covered with the desired gymnasium finish. Permanent decals may also be applied to top surface 22 of wood floor 12 wherein the decal is applied to the wood floor 12 and covered and sealed under the layers permanent gymnasium finish just like any painted lines, logos, words, or signage.

The Maple Flooring Manufacturer's Association issues specifications for gymnasium finishes and sealers for maple, beech and birch floors. These specifications have become the industry standard for wood floors used in gyms for athletic sports like basketball. Theses specifications require that the finished surface must have a coefficient of friction between 0.50 and 0.70 using a James Machine. Thus, numerous water and oil-based finishes exist which, when applied to the wood floor and dried, consistently result in a coefficient of friction between 0.50 and 0.70. Moreover, under current sports governing organization rules, any temporary or semi-permanent decals applied to such a wood floor must also have a coefficient of friction between 0.50 and 0.70.

Visible layer 14 is preferably a printable flexible vinyl layer, but could be any printed or colored material used in the industry as an applied decal. Such alternative materials may be cast or calendered vinyl. As shown in FIG. 2, visible layer 14 may have a visible surface 24 and an adhered surface 26 opposite the visible surface 24, wherein visible surface 24 and adhered surface 26 define a sheet thickness. Visible layer 14 of decal 10 may be a film and may have a sheet thickness of around 2 mils to around 10 mils. Visible layer 14 may have a desired image or lettering printed on visible surface 24. Alternatively, visible layer 14 may be a shape, such as a letter or number, cut-out of a solid color of visible layer material.

Visible layer 14 may be adhered to the top surface 22 of wood floor 12 using an adhesive layer 28. Adhesive layer 28 may be pre-applied to the adhered surface 26 of visible layer 14, or may be separately applied to one of adhered surface 26 and top surface 22 of wood floor 12 during application. In one embodiment, adhesive layer 28 may be a low-tack removable or repositionable adhesive for easy removal and/or repositioning of the present decal 10. Adhesive layer 28 may also be a permanent or semi-permanent adhesive.

Clear layer 16 is preferably a clear flexible vinyl layer, but could be any clear material that is adhered as a film to another surface. As shown in FIG. 2, clear layer 16 includes an outer surface 30 and an adhered surface 32 opposite the outer surface 30. The outer surface 30 and the adhered surface 32 define a clear layer sheet thickness. Clear layer 16 of decal 10 may be a film and have a sheet thickness of around 1.7 mils to around 10 mils. The outer surface 30 of clear layer 16 may be mechanically roughened or may be manufactured with a roughened texture. The outer surface 30 of clear layer 16 may be mechanically roughened using an abrasive material, such as a buffing pad, sand paper, steel wool, or other abrasive object. Clear layer 16 may be adhered to the visible surface 24 of visible layer 14 using an adhesive layer 34. The adhesive layer 34 may be pre-applied to the adhered surface 32 of clear layer 16, or may be separately applied to one of the adhered surface 32 and the top surface 22 of visible layer 14 prior to contacting clear layer 16 to visible layer 14.

Adhesion promotion layer 18 is generally a liquid that that is applied to outer surface 30 of clear layer 16 known in the art as an adhesion promoter for a wood floor finish. Adhesion promoter 18 may be applied to the outer surface 30 of clear layer 16 as a fluid using any application method known in the art, such as a brush, roller, mop, lamb's wool pad, or other known application method. An example of such an adhesion promotion liquid is TYKOTE® by Basic Coatings, Inc. of Toledo, Ohio. However, other similar adhesion promoters now known in the art, or developed hereafter, are within the scope of the present invention. As show in FIG. 2, upon the application and drying of adhesion promotion layer 18, it has a top surface 36 and a bottom surface 38.

Adhesion promotion layer 18 may facilitate a chemical bond between outer surface 30 of clear layer 16 and surface 42 of floor finish layer 20. Preferably, bottom surface 38 of adhesion promotion layer 18 fills in the roughened surface 30 of clear layer 16 so as to provide improved mechanical bonding between clear layer 16 and adhesion promotion layer 18.

Floor finish layer 20 may be any wood floor finish used in the art. Floor finish layer may be a floor finish approved by the Maple Floor Manufacturing Association. Preferably, floor finish layer 20 is a water-based gym floor finish that is applied per the manufacturer's recommendations. As shown in FIG. 2, floor finish layer 20 is applied to adhesion promotion layer 18 as a liquid over the top surface 36 of adhesion promotion layer 18. Similarly, floor finish layer 20 may be applied using a brush, roller, lamb's wool pad, mop, or any other method common in the flooring industry. Another embodiment of the present invention includes floor finish layer 20 being an oil-based finish approved by the Maple Floor Manufacturing Association.

In yet another embodiment, floor finish layer 20 may be applied directly to the outer surface 30 of clear layer 16 without adhesion promoter layer 18. Similarly, in this embodiment, surface 30 of clear layer 16 is preferably mechanically roughened or manufactured with a roughened texture so as to provide improved mechanical bonding between clear layer 16 and finish layer 20.

Decal 10 may be pre-made at an off-site location or controlled environment in its entirety prior to being applied on wood floor 12. Alternatively, decal 10 may be entirely assembled on-site and each individual layer being applied in a sequential order. In another installation sequence, a visible decal layer 14 may be printed or otherwise configured to provide the desired visual display and clear layer 16 is preferably laminated to the visible decal layer 14 using adhesive layer 34 off-site in a controlled environment. The outer surface 30 of clear layer 16 is roughened before or after adhering it to the visible decal layer 14 and may be roughened prior to or after the combined layers are applied to wood floor 12. Then, the liquid layers are applied on-site during installation on the wood-floor. Other configurations and sequences are also within the scope of the present invention.

In this preferred method for installing the present decal on wood floor 12, the laminated visible layer 14 and adhered clear layer 16 are transported to the location of wood floor 12 wherein adhered surface 26 of visible layer 14 is adhered to top surface 22 of wood floor 12. Next, adhesion promotion layer 18 is applied as a liquid over the outer surface 30. Then floor finish layer 20 is applied over adhesion promotion layer 18 once the adhesion promotion layer 18 has dried.

As shown in FIG. 1, decal 10 may include a pre-cut border 44 around the extents of the desired decal or shape of the decal that is defined by a cut line 46. Such border 44 may include an extra-width or portion of decal material outside cut line 46 around the exterior of the final decal 10, or may also include portions of the material of decal 10 not intended to remain on the floor after installation, such as the space between letters, numbers, or other graphics. The purpose of border 44 is to allow for the liquid adhesion promotion layer 18 and floor finish layer 20 to be applied over the entirety of decal 10, cover-up to the cut line 46, and extend into border 44. Border 44 may be generally pre-cut along cut line 46 so that the border 44 may be easily removed after application of the adhesion promotion layer 18 and the floor finish layer 20. This construction allows for the on-site application of adhesion promotion layer 18 and floor finish layer 20, and also results in all liquid coatings staying on top of decal 10 so that adhesion promotion layer 18 and floor finish layer 20 do not overlap or spill over onto wood floor 12. If adhesion promotion layer 18 and/or floor finish layer 20 spill over or overlap onto the wood floor, then a permanent bond between decal 10 and wood floor 12 may result due to a continuous hardened floor finish layer 20 bound to both decal 10 and wood floor 12. This result is not desirable in a decal 10 that is intended for to be removable at will.

Alternatively, another preferred method of making decal 10 includes decal 10 being entirely constructed in a manufacturing facility, with clear layer 16 being mechanically applied to the visible layer 14. The clear layer 16 is then roughened (abraded, scratched) in preparation of the adhesion promotion layer 18 and floor finish layer 20. The adhesion promotion layer 18 and the floor finish layer 20 are an applied in a liquid state and allowed to dry. The adhesion promotion layer 18 and the floor finish layer 20 are applied sequentially in this controlled environment. The entire decal 10 is then transported to the location of wood floor 12 and applied onto top surface 22 of wood floor using adhesive layer 28 and is ready for immediate use upon application.

Decal 10 of the present invention has shown durability in testing of the lamination and coating configuration claimed herein. In laboratory tests, the finish layers no longer delaminated from the visible layer as previously experienced, but rather decal 10 was pulled away in its entirety from the wood floor upon failure. Thus, the durability of decal 10 according to the present invention is dependent upon the strength of the bond between the wood floor 12 and visible layer 12 with adhesive layer 28. As such, the present decal 10 is a substantial improvement over the existing decals currently used in the art.

As is evident from the foregoing description, certain aspects of the present invention are not limited to the particular details of the examples illustrated herein. It is therefore contemplated that other modifications and applications using other similar or related features or techniques will occur to those skilled in the art. It is accordingly intended that all such modifications, variations, and other uses and applications which do not depart from the spirit and scope of the present invention are deemed to be covered by the present invention.

Other aspects, objects, and advantages of the present invention can be obtained from a study of the drawings, the disclosures, and the appended claims.

We claim:

1. A method for assembling a decal for use on a finished wood floor, the method comprising the steps of:
   laminating a clear film layer to a visible film layer;
   roughening an outer surface of the clear film layer;
   applying a liquid floor finish to the outer surface of the clear film layer after the roughening step.

2. The method for assembling a decal for use on a finished wood floor of claim 1 further comprising applying an adhesion promotion layer to the outer surface of the clear film layer after the roughening step and prior to the applying the floor finish layer step.

3. The method for assembling a decal for use on a finished wood floor of claim 2 wherein the adhesion promotion layer and the floor finish layer are liquid and all method steps are performed off-site in a controlled environment.

4. The method for assembling a decal for use on a finished wood floor of claim 1 wherein said clear film layer is clear flexible vinyl.

5. The method for assembling a decal for use on a finished wood floor of claim 1 wherein said visible film layer is a flexible vinyl layer having one of: an image or lettering printed thereon, or a shape cut-out of a sheet of said flexible vinyl.

6. The method for assembling a decal for use on a finished wood floor of claim 5 wherein said clear film layer is clear flexible vinyl.

\* \* \* \* \*